United States Patent [19]

Barney et al.

[11] Patent Number: 4,630,214
[45] Date of Patent: Dec. 16, 1986

[54] JIG GRINDER WITH AUTOMATIC RECIPROCATION AND OUTFEED CONTROL

[75] Inventors: Kevin S. Barney, Monroe; Theodore J. Langevin, Seymour; Harold W. Lawson, Jr., Shelton; Dennis A. Winski, Fairfield, all of Conn.

[73] Assignee: Moore Special Tool Co., Ltd., Bridgeport, Conn.

[21] Appl. No.: 600,286

[22] Filed: Apr. 13, 1984

[51] Int. Cl.$^4$ .................. G06F 15/20; B24B 49/00; B23Q 5/10; G05B 19/18
[52] U.S. Cl. .................. 364/474; 51/165.77; 51/165.92; 364/171; 364/475; 318/39
[58] Field of Search ............... 364/167, 168, 169, 170, 364/171, 172, 173, 174, 474, 475, 477; 318/567, 39, 568, 569, 573, 594; 51/165.71, 165.72, 165 TP, 21, 165.77, 165.92, 147, 146

[56] References Cited

U.S. PATENT DOCUMENTS

| | | | |
|---|---|---|---|
| 3,888,051 | 6/1975 | Belthle | 51/165.77 |
| 3,898,767 | 8/1975 | Kobayashi | 51/165.77 |
| 3,909,989 | 10/1975 | Tomita et al. | 51/165.77 |
| 4,005,303 | 1/1977 | Inoue | 364/477 |
| 4,074,349 | 2/1978 | Ueda | 364/475 |
| 4,115,858 | 9/1978 | Kaufman | 364/474 |
| 4,150,513 | 4/1979 | Smith et al. | 51/165.77 |
| 4,293,913 | 10/1981 | Nishimura et al. | 364/171 |
| 4,384,333 | 5/1983 | Maecker | 364/474 |
| 4,489,522 | 12/1984 | Henseleit et al. | 364/171 X |
| 4,504,917 | 5/1985 | Grimm et al. | 364/474 |
| 4,510,565 | 9/1985 | Dummermuth | 364/174 X |
| 4,524,543 | 6/1985 | Inoue | 51/165.92 |
| 4,527,244 | 7/1985 | Graham, Jr. et al. | 364/474 |
| 4,547,996 | 10/1985 | Winski | 364/474 |

Primary Examiner—Jerry Smith
Assistant Examiner—Jon D. Grossman
Attorney, Agent, or Firm—Kramer and Brufsky

[57] ABSTRACT

A control system for an automated jig grinder enables an operator to designate an incremental outfeed distance to be traversed for each outfeed operation and a reciprocation stroke count to be completed between successive outfeeds. The control system counts grinding tool reciprocation strokes and actuates an outfeed mechanism to outfeed the grinding tool the designated outfeed distance when the designated reciprocation stroke count has been reached. The incremental outfeed distance and reciprocation stroke count settings can be modified by the machine operator on a real time basis as the machine is running. The control system also enables the grinding tool to automatically travel from its upper position toward a workpiece at a first relatively high rate of speed, and then change to a slower rate of speed as the tool approaches the workpiece. This aspect of the invention is useful in wipe grinding. Alternatively, the control system allows the grinding tool to automatically travel from its upper position toward a workpiece at an initial slow rate of speed, and then change to a higher rate of speed for reciprocation. In this manner, excessive overshoot past the reciprocation limits established by an operator can be prevented.

14 Claims, 7 Drawing Figures

AUTOMATIC OUTFEED FLOWCHART

JIG GRINDER WITH AUTOMATIC RECIPROCATION AND OUTFEED CONTROL

BACKGROUND OF THE INVENTION

The present invention relates to machine tools, and more particularly to a jig grinder having automated reciprocation and outfeed control.

Jig grinders are used by machinists to accurately grind precision holes, radii, blends, and surfaces in metal or other materials. These machine tools are used in the manufacture of a wide variety of high precision products. For example, jig grinders are used by the automotive and aerospace industries for producing engine parts, gears, and the like. Although extreme precision is the primary goal of such application, productivity is a main concern, particularly in keeping the cost of individual machine parts as reasonable as possible. Accordingly, recent advances in jig grinder design have concentrated on automatiing the grinding process in an effort to increase machine through-put while maintaining accuracy.

Various grinding techniques which can be accomplished with jig grinders are well known. One such technique is the use of "chop grinding" in the generation of contours. The chop grinding principle utilizes a rapid reciprocation of the grinding wheel in a direction along the wheel axis. It has been found that this technique grinds cool, providing more consistent surface finishes, geometry and size than other, more conventional grinding techniques.

Chop grinding can be used to machine holes and edges as well as radii. There are several different motions which occur simultaneously during a chop grinding process. One motion is that of the grinding wheel which rotates, typically at a high rate of speed. The grinding wheel can also be rotated in a planetary manner with respect to the jig grinder spindle, for example when chop grinding a hole. As noted above, the grinding wheel will also be reciprocated up and down, along the axis thereof. Reciprocation of the grinding wheel occurs along the "Z'-axis" of the jig grinder. Finally, as the grinding of a surface progresses, the grinding wheel will be indexed toward the surface being ground until the desired amount of stock has been removed from the work being machined. This latter movement is referred to as "outfeed". For purposes of the present specification, the outfeed movement is referred to as movement along the "U-axis" of the jig grinder.

In the past, jig grinders have been largely manually operated. In performing a chop grinding task, a machine operator would manually index the grinding wheel against the surface to be ground, and commence grinding with a rotating and reciprocating grinding wheel. As material was ground away from the surface of the workpiece, the machine operator would manually outfeed the grinding wheel until the required amount of material was ground off. Upon each outfeed operation, the grinding wheel would create a shower of sparks as it proceeded to strip material from the grinding surface. A machine operator would then wait until the sparks stopped, indicating that the grinding wheel had removed all of the stock up to the outfed position (or the grinding wheel had worn to a point where an outfeed adjustment was necessary). The operator would then manually repeat the cycle until the finished dimensions were reached.

Wipe grinding, which is a technique wherein the grinding wheel is not reciprocated, has also been done manually in the past. An operator would bring the grinding wheel to the surface to be ground, and manually index the grinding wheel toward the workpiece until the required amount of stock material had been removed. When wipe grinding, an operator would slowly and repetitively feed the grinding wheel toward the surface being ground.

It would be advantageous to provide a jig grinder which is automated to reduce the number of manual operations required of the machine operator. Such an automated machine tool would increase machine productivity and preserve, if not improve, the accuracy to which parts are machined. The present invention relates to an automated machine tool in which these and other advantages are achieved.

SUMMARY OF THE INVENTION

In accordance with the present invention, a control system is provided for a machine tool (such as a jig grinder) having a spindle, a grinding tool coupled to the spindle, means for outfeeding the grinding tool from the spindle axis, and means for reciprocating the grinding tool. The control system comprises means for enabling an operator to designate an incremental outfeed distance to be traversed for each outfeed operation. Means is also provided for enabling an operator to designate a reciprocation stroke count to be completed between successive outfeeds. Means is provided for counting reciprocation strokes of the grinding tool, and means responsive to the counting means is provided for actuating the jig grinder outfeeding means to outfeed the grinding tool the designated outfeed distance when the reciprocation stroke count has been reached.

It is noted that an outfeed operation can occur prior to the counting of reciprocation strokes, in which case the next outfeed increment will be inhibited until the reciprocation stroke count has been reached. Alternatively, the counting of reciprocation strokes can be commenced prior to effecting an outfeed, in which case the control system will produce an outfeed signal after the designated number of reciprocation strokes has been counted.

The control system of the present invention can further comprise means for restarting the counting means each time the outfeed means is actuated. In addition, means can be provided for enabling an operator to designate an upper reciprocation limit and a lower reciprocation limit to establish a reciprocation stroke length.

The means for enabling an operator to designate an incremental outfeed distance can comprise switch means interfaced with a computer or equivalent electronic circuitry, logic, etc. (hereinafter interchangeably referred to as "a computer"). The computer could be adapted to monitor the switch means during the reciprocation of the spindle to produce an outfeed signal in accordance with the most recent outfeed distance increment entered by an operator. In this manner, the operator would be able to alter the outfeed distance increment while the spindle is reciprocating.

Similarly, the means for enabling an operator to designate a reciprocation stroke count could comprise switch means coupled to a computer (as defined above). The computer could be adapted to monitor the switch means during the reciprocation of the spindle to determine the most recently entered reciprocation stroke count data. Thus, the operator could alter the designated reciprocation stroke count while the spindle is reciprocating.

The present invention also provides for machining operations such as wipe grinding by providing, in a machine tool having a spindle and a work table, means for moving the spindle toward the work table at different rates of speed. The spindle is moved toward the table from an upper position by means having an hydraulic circuit. The improvement comprises a first orifice in the hydraulic circuit for passing hydraulic fluid at a first rate of flow and a second orifice in the hydraulic circuit for passing hydraulic fluid at a second rate of flow. Electrically actuable means are provided for switching at least one of the orifices in and out of the hydraulic circuit to enable the spindle to travel from the upper position toward the table at a relatively fast initial rate of speed and to enable the spindle to subsequently continue its travel toward the table at a relatively slow rate of speed. In one embodiment, a computer is coupled to the electrically actuable means to control the rate of speed at which the spindle travels. At least one of the orifices can be manually adjustable to provide variable rates of flow thereacross, and hence variable spindle travel speeds.

DETAILED DESCRIPTION OF A PREFERRED EMBODIMENT

The present invention provides an improved, automated jig grinder. Specific features provided by the jig grinder include the actuation of outfeed in accordance with reciprocation stroke count data and the automatic control of spindle travel, at different rates of speed, during wipe grinding operations. Other features enable a machine operator to change outfeed and reciprocation stroke count settings while the machine is in operation. These and other features and advantages of the invention will become apparent from the following detailed description of a preferred embodiment when considered in connection with the accompanying drawings.

Figure 1:
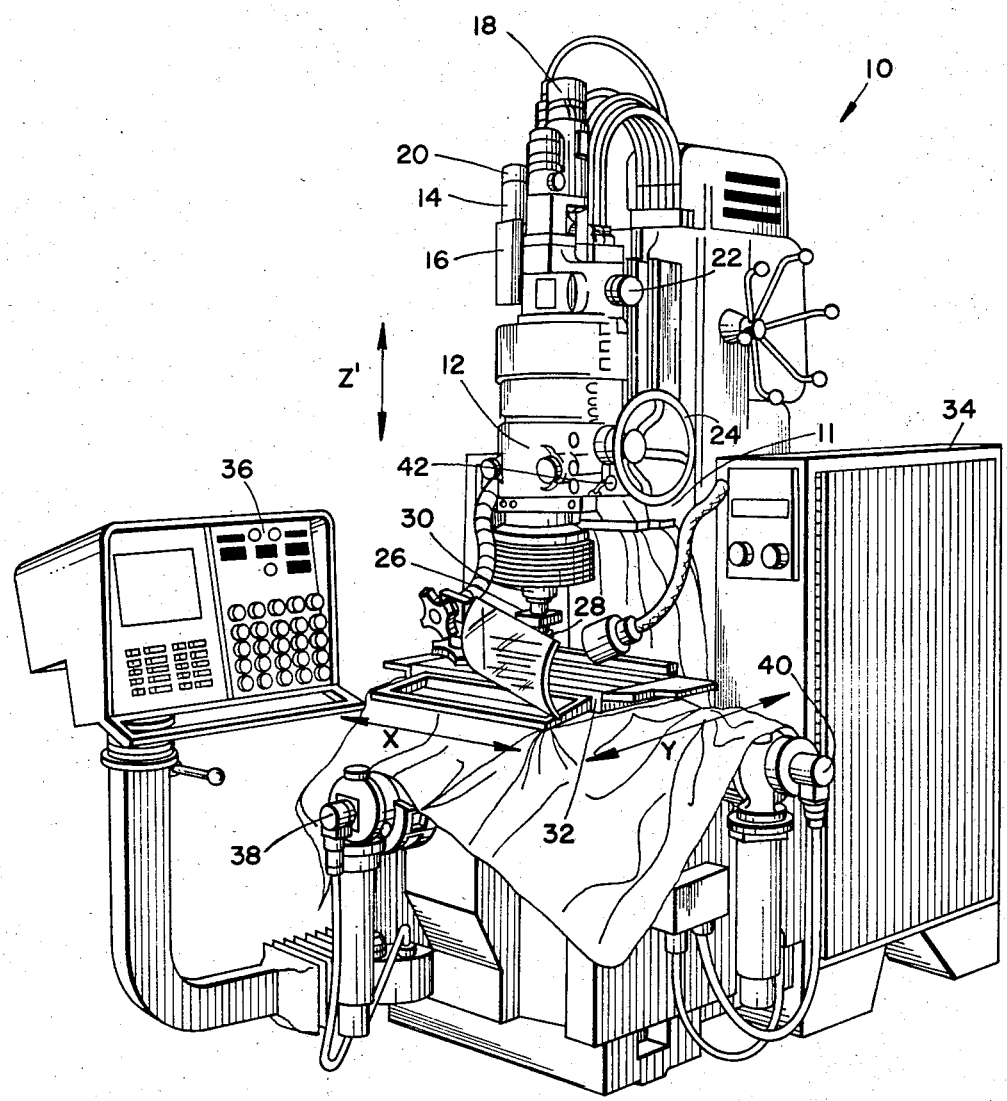
FIG. 1 is a perspective view showing the overall appearance of a jig grinder in accordance with the present invention.

Turning now to FIG. 1, an overall view of a jig grinder 10 is shown. Jig grinders similar to that shown in FIG. 1 are manufactured by Moore Special Tool Co., Inc., the assignee of the present invention. Prior manually operated versions of such jig grinders are well known in the art. Jig grinder 10 includes a fixed housing 11 to which a grinding head 12 is slidingly mounted. Grinding head 12 is adapted to move up and down vertically, along the Z'-axis as designated by the vertical arrow shown in FIG. 1. Grinding head 12 carries a spindle 30 therewithin which is coupled to motor 18 for rotation. Spindle 30 has a tool holder 26 mounted thereto which carries a grinding tool 28. Typically, grinding tool 28 is an abrasive wheel.

Included in tool holder 26 is an offset mechanism which can be used to offset tool 28 from the longitudinal axis of spindle 30. The offset mechanism is controlled through a series of gears and links connected to a stepper motor 14. An encoder 20 is coupled to stepper motor 14 and provides an output indicative of the angular position of the stepper motor shaft. It is noted that a servo motor connected in a closed position loop arrangement could be used instead of a stepper motor. A separate encoder 16 mounted to housing 11 provides an output indicative of the position of grinding head 12, and hence spindle 30 and tool 28 with respect to housing 11.

Housing 11 also carries a table 32 which is adapted to be moved in the X and Y directions respectively by motors 38 and 40. An operator control panel 36 enables an operator to interface with the automatic machine controls. Cabinet 34 houses a numerical controller and associated computer equipment.

Movement of grinding head 12 with respect to housing 11 can be controlled manually by manipulating hand wheel 24, or automatically via the operator control panel 36. A manually adjustable orifice 22 is provided to enable an operator to control the speed at which grinding head 12 reciprocates in the automatic mode. An additional manually adjustable orifice (not shown) can be provided for fine control of the reciprocation speed. A hand lever 42 is provided to override all other controls and move grinding head 12 up under automatic control.

Figure 2:
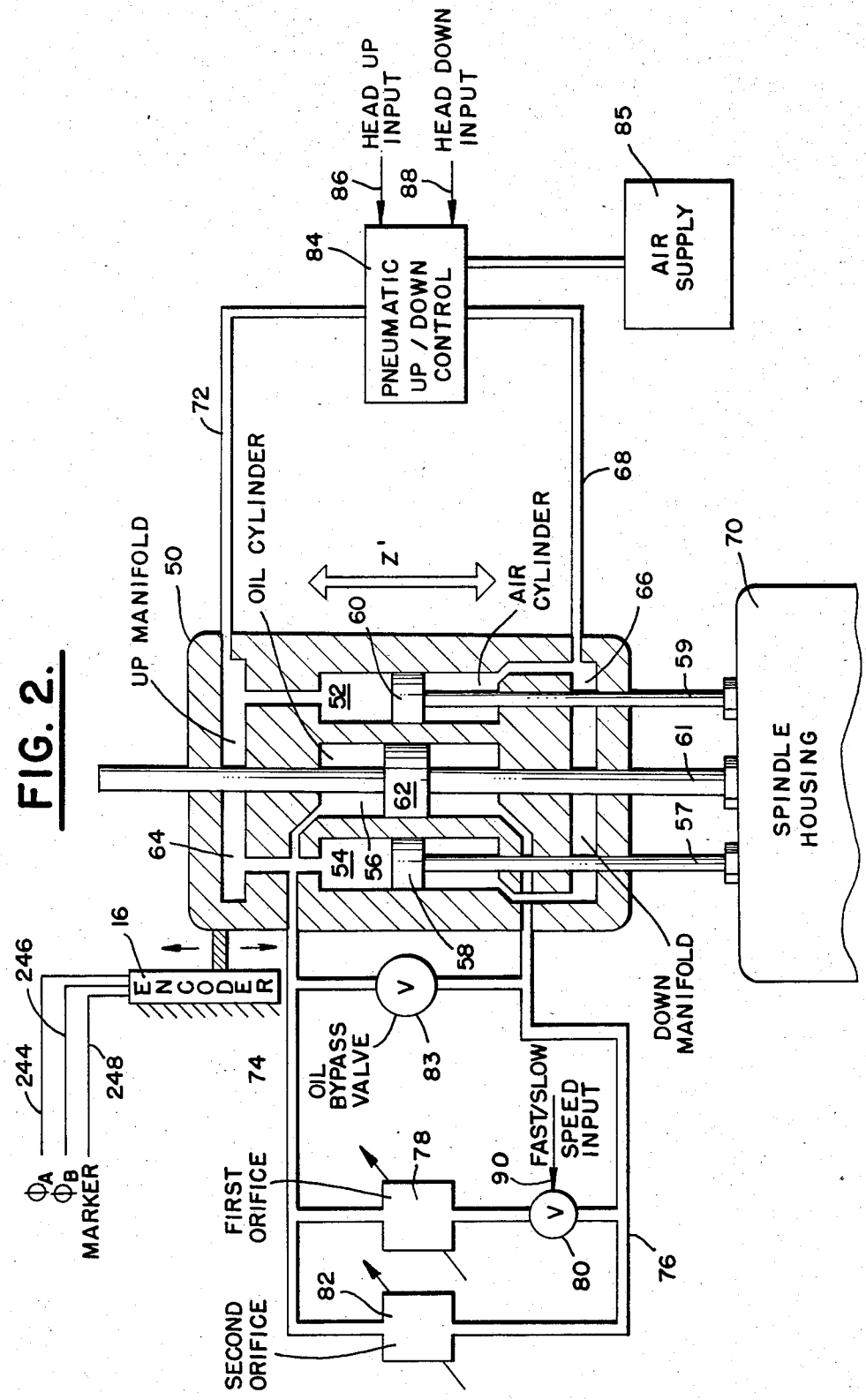
FIG. 2 is a diagrammatic view of the hydraulic and pneumatic system which is used to move and reciprocate the grinding head yoke which carries the machine tool spindle.

FIG. 2 shows the hydraulic and pneumatic system which controls the movement and reciprocation of grinding head 12 along the Z'-axis. Grinding head yoke 50 contains two double ended air cylinders 52, 54 and one double ended oil cylinder 56. Air cylinders 52, 54 and oil cylinder 56 control the vertical motion of the yoke assembly. Air cylinders 52, 54 house pistons 60 and 58, respectively. Piston 60 is connected to a rod 59 and piston 58 is connected to a rod 57. A piston 62 is connected to a rod 61 and is housed in oil cylinder 56. Rods 57, 59, and 61 are fixed to spindle housing 70. Yoke housing 50 moves along the Z'-axis as shown by the arrow, to provide for vertical motion of the spindle. Spindle housing 70 remains stationary.

Vertical feed can be accomplished in any of three ways; namely, manually by the use of hand wheel 24, by use of hand trip lever 42, or by automatic reciprocation. When operated manually, air pressure is not supplied to air cylinders 52, 54. Further, an oil bypass valve 83 is open to allow an unrestricted flow of oil between the ends of oil cylinder 56.

Oil cylinder 56 and the piping system connecting its two ends is completely filled with oil. There is no external source or drain of oil. Since the oil is essentially incompressible, any motion of the yoke 50 relative to the spindle housing 70 must displace oil in the end of the oil cylinder in the direction of travel. This oil is piped by one of three paths to the other end of the oil cylinder. One path is through oil bypass valve 83, and is used when the yoke is to be moved in the manual mode by hand wheel 24. The other paths, comprising first orifice 78 and second orifice 82 are used in the automatic mode of operation.

In the automatic modes, oil bypass valve 83 is closed. Thus, in order for movement of the yoke 50 to occur, oil must flow between either or both of first and second orifices 78, 82. In the automatic modes, air pressure is supplied from air supply 85 either to up manifold 64 of yoke 50 or down manifold 66 thereof. The air pressure (which may, for example, be at a constant pressure of approximately 85 psi) applies a large constant force on the air cylinder pistons 58, 60 and the ends of cylinders 54, 52. Since the pistons are fixed in position relative to spindle housing 70, the air pressure will cause cylinders 52, 54 to move. Air cylinders 52, 54 are part of yoke housing 50, and therefore, the yoke will move relative to the spindle housing when air pressure is applied to the up manifold 64 or down manifold 66.

Air pressure to up manifold 64 is controlled by pneumatic up/down control unit 84 via conduit 72. Air pressure to down manifold 66 is controlled by pneumatic up/down control unit 84 via conduit 68. Pneumatic up/down control unit 84 is controlled by an electrical head up input 86 and head down input 88 described in greater detail below.

If there is no restraining force on yoke 50, the force from air pressure in the up or down manifolds causes the yoke to move very rapidly. A restraining force is provided, however, by the oil in oil cylinder 56 and its associated piping system. In order for the yoke to move, oil in one end of oil cylinder 56 must flow into the other end, and this flow of oil can be controlled to regulate the speed of the yoke motion.

In the automatic modes of operation, the rate of flow of oil from oil cylinder 56 is controlled by first and second orifices 78, 82. When yoke 50 is moving up, oil will flow from oil cylinder 56 through pipe 76, across second orifice 82, and back to the top of oil cylinder 56 via pipe 74. If valve 80 is open, oil will also flow from pipe 76 across first orifice 78 to pipe 74. When yoke housing 50 is moving down, the oil will flow through the same circuit, but in the opposite direction. The greater the restriction provided by first and second orifices 78, 82, the slower will be the travel of yoke 50.

In commencing an automated wipe grinding procedure, it is desirable to get the grinding wheel to the workpiece as quickly as possible, but in a controlled fashion. In other words, when tool 28 is near the workpiece, it is desirable to slowly bring the tool into contact with the surface to be ground. However, it is not desirable to waste a lot of time moving the spindle from its upper position all the way down to the workpiece. Accordingly, the present invention provides means for enabling the spindle to travel from the upper position toward table 32 (on which the workpiece is mounted) at a relatively fast initial rate of speed and to enable the spindle to subsequently continue its travel toward table 32 at a relatively slow rate of speed as the tool is brought into contact with the surface to be ground. This feature is provided by the use of first orifice 78 and second orifice 82 in conjunction with electrically actuated valve 80.

First orifice 78 is of a size to pass hydraulic fluid from oil cylinder 56 at a first rate of flow. Second orifice 82 is of a size which passes hydraulic fluid at a second rate of flow. In the hydraulic circuit shown in FIG. 2, first orifice 78 is larger than second orifice 82, and therefore will pass hydraulic fluid at a higher rate of flow.

Figure 5:
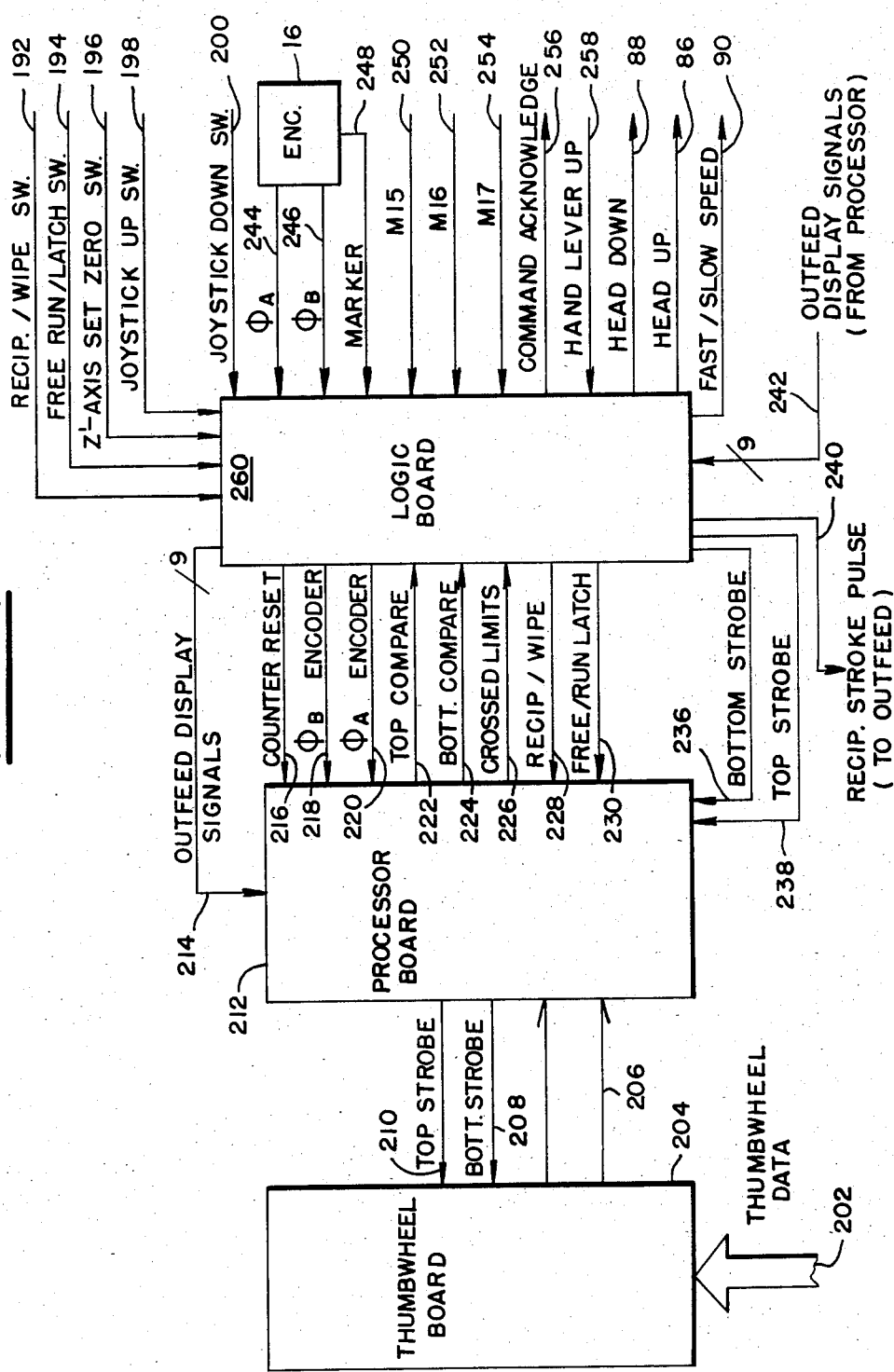
FIG. 5 is a block diagram of the electrical circuitry for the reciprocation and display functions of the jig grinder.

Valve 80 is controlled by a fast/slow speed input signal 90 from the reciprocation and display logic shown in FIG. 5. Initially, as yoke 50, and thus spindle 30, travels downwardly from an upper position, the fast/slow speed input will comprise an electrical signal which causes valve 80 to open. This will permit hydraulic fluid from oil cylinder 56 to travel across both first orifice 78 and second orifice 82. Since both orifices will be open, and first orifice 78 is larger than second orifice 82, the downward movement of yoke 50 will occur at a relatively fast initial rate of speed. As yoke 50 travels downwardly, fast/slow speed input 90 will change state in response to a limit value set by a machine operator. This will cause valve 80 to close so that hydraulic fluid from oil cylinder 56 can travel only through second orifice 82. As a result, the downward travel of yoke 50 will slow down, because of the reduced flow path for hydraulic fluid from oil cylinder 56. The limit value is set by the machine operator such that yoke 50 will slow down at the point where spindle 30 approaches contact with the surface to be ground.

First and/or second orifices 78, 82 can be manually adjustable to change the size thereof, and thus change the rate of flow thereacross. By providing manually adjustable orifices, a machine operator can adjust the relatively fast and relatively slow rates of speed at which spindle 30 will travel toward table 32. Adjustment of the orifices will also permit a machine operator to establish a desired reciprocation rate.

Automatic reciprocation is controlled by the reciprocation and display logic shown in FIG. 5 in combination with an encoder 16 (FIG. 2) and pneumatic up/down control unit 84. A reciprocation zone (reciprocation stroke length), set by a machine operator as described hereinbelow, comprises an upper reciprocation limit and a lower reciprocation limit. When yoke 50 reaches either of these limits, the occurence is detected by logic 260 (FIG. 5) which is coupled to encoder 16 through electrical lines 244, 246, and 248. When yoke 50 reaches the upper reciprocation limit set by the machine operator, a head down signal will be transmitted from logic 260 via electrical line 88 to pneumatic up/down control unit 84. The head down signal will cause a valve in pneumatic up/down control unit 84 to couple air from air supply 85, through air conduit 68 to down manifold 66 of yoke 50. The resultant air pressure in air cylinders 52 and 54 will cause yoke 50 to travel downwardly as shown in FIG. 2. As yoke 50 travels down, it will reach the lower reciprocation limit set by the machine operator. This occurence will be detected by encoder 16 and logic 260, and a head up signal will be transmitted by logic 260 via electrical line 86. The head up signal is coupled to pneumatic up/down control unit 84 and, when present, causes a valve to couple air from air supply 85 to air conduit 72 and up manifold 64 of yoke 50. The air pressure in up manifold 64 will cause yoke 50 to move upwardly toward the upper reciprocation limit. As pneumatic up/down control unit 84 switches the flow of air from air supply 85 alternately to up manifold 64 and down manifold 66, yoke 50 will move with a reciprocating motion. Pneumatic up/down control unit 84 also includes means to exhaust air from down manifold 66 when air pressure is introduced into up manifold 64, and to exhaust air from up manifold 64 when air pressure is being introduced into down manifold 66. Such control is accomplished with conventional electrically actuated valves.

It is sometimes desireable to commence a chop grinding procedure by slowly bringing the grinding wheel from its initial upper position to the upper reciprocation limit, and then commencing reciprocation at the desired reciprocation rate. In this manner, excessive overshoot past the reciprocation limits (which would otherwise result from the inertia of yoke 50 when reciprocation begins) can be prevented. To accomplish this, first orifice 78 can be switched out of the hydraulic circuit by closing valve 80 when a chop grinding procedure is begun. Once the upper reciprocation limit is reached, valve 80 can be opened so that reciprocation will occur at a desired faster speed.

Figure 4:
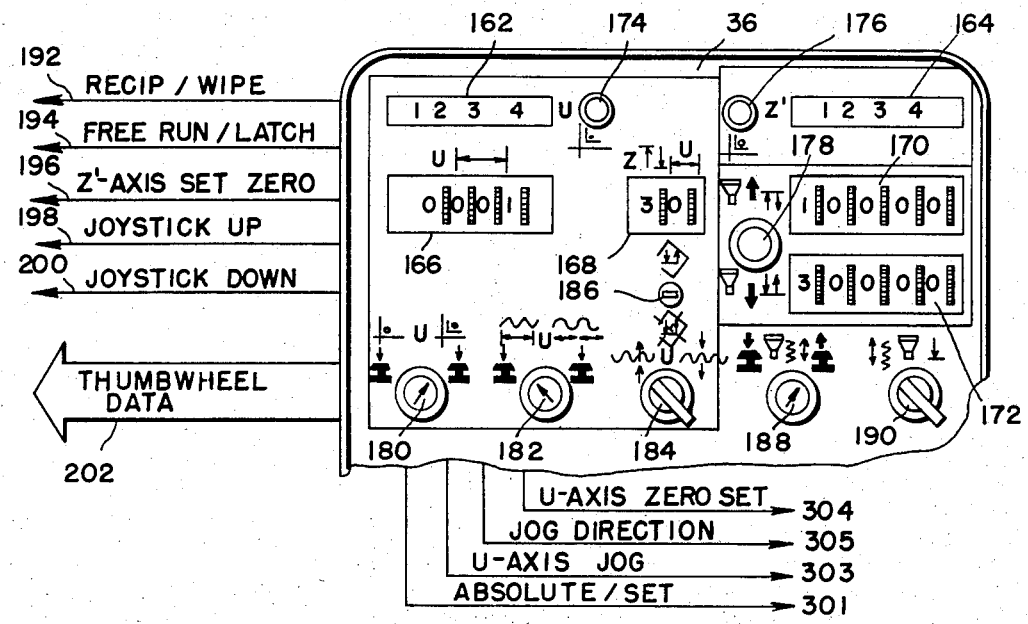
FIG. 4 is a partial view of the operator panel for the jig grinder shown in FIG. 1.

Turning now to FIGS. 4 and 5, the reciprocation circuitry and associated operator control and display will be described. FIG. 4 is a portion of the jig grinder operator panel 36 which includes the controls and display necessary for a description of the present invention. Controls and displays which are marked with the letter "U" relate to motion along the U-axis (outfeed). Controls and displays marked with the letter "Z'" relate to motion along the Z'-axis (vertical motion) of the spindle.

Display 164 shows a machine operator the position of the tool 28 on the Z'-axis. The position displayed can be either the lower Z'-axis reversal point (the lower reciprocation limit set by the machine operator) or the instantaneous Z'-axis position. Selection of which data is displayed is made by pushing toggle switch 186 up (in which the lower reciprocation reversal point is displayed) or down (in which the instantaneous position of tool 28 on the Z'-axis is displayed).

Thumbwheel switches 170 and 172 are used to set the upper and lower reciprocation limits, respectively. The thumbwheel switches are set to display the desired distances to be traversed relative to the absolute zero point of the yoke 50, as detected by encoder 16. Joystick 178 is an autofeed manual override switch. This three-position toggle switch initiates upward or downward movement of yoke 50 at any time when the machine tool is in use. Switch 190 is an auto-feed mode selector. This two-position switch selects either the reciprocation mode or the wipe grind mode of machine use. Switch 188, when actuated, energizes the automatic feed of the yoke 50 to commence a reciprocation or wipe grind cycle.

As shown in FIG. 4, control panel 36 comprises a plurality of electrical output lines. Line 192 carries a signal from switch 190 which is used by the control logic to determine whether the machine is to operate in the reciprocation mode or the wipe grind mode. Line 194 carries the signal from switch 186 which indicates whether display 164 is to be in the free run mode (showing the instantaneous position of the tool 28 on the the Z'-axis) or the latch mode (showing the lower reciprocation reversal point).

Line 196 carries a signal labeled "Z'-axis set zero", which is present when switch 176 is actuated. Switch 176 sets the zero position for the Z'-axis when the machine tool is in the wipe grind mode of operation.

Lines 198 and 200 from control panel 160 carry the joystick up and joystick down signals, respectively, from joystick 178. Data from the Z'-axis thumbwheel switches 170 and 172 is carried on the thumbwheel data line 202.

Turning now to FIG. 5, the reciprocation and display control circuitry ("computer") is shown in block diagram form. In a preferred embodiment, hard wired logic board 260 provides control of various machine functions. With the exception of the thumbwheel data, the switch outputs from the Z'-axis portion of operator control panel 36 are input to logic 260. Other inputs to logic board 260 are lines 244, 246, and 248 from the $\phi_A, \phi_B$, and marker outputs of encoder 16. As noted above, encoder 16 monitors the actual position of yoke 50 with respect to a fixed reference point on the machine tool housing. Input lines 250, 252 and 254 carry program signals from the numerical controller in cabinet 34 of jig grinder 10. Code "M15" is the function used to drive the grinding head down, initiating reciprocation. In order for the M15 code to be effective, switch 190 on operator panel 36 must be set to the reciprocation mode of operation. Code "M16" is the function used to drive the grinding head (yoke 50) up and stop reciprocation. The M15 code is canceled by an M16 code. When an "M17" code is programmed, the grinding head is driven down and held in position at the bottom of the grinding stroke or positive stop. The M17 code is used in wipe grinding operations, and can only be canceled by an M16 code. In order to use an M17 code, switch 190 on operator panel 160 must be set to the wipe grinding position.

Line 256 from logic board 260 carries a command acknowledge signal to the numerical controller to indicate that a programmed operation has been completed. Input line 258 to logic board 260 carries a signal from hand lever switch 42 (see FIG. 1) which overrides all other control and immediately causes logic board 260 to output a head up signal to pneumatic up/down control unit 84 shown in FIG. 2. The head up and head down signals are carried on lines 86 and 88, respectively, from logic board 260 to pneumatic up/down control unit 84. The speed of grinding head travel along the Z'-axis is controlled by the fast/slow speed signal which is output from logic board 260 on line 90. This signal is coupled to valve 80 (FIG. 2) for opening or closing the flow of hydraulic fluid to first orifice 78, as described above.

Another section of the reciprocation and display circuitry comprises counters, decoders and drivers for displays 162 and 164 on operator control panel 36, comparators to determine when the grinding head has reached preset upper and lower reciprocation limits, and decoders for encoder 16. These components are represented by box 212 in FIG. 5 (hereinafter referred to as the "processor board").

Various signals flow between processor board 212 and logic board 260. A counter reset signal carried on line 216 from logic board 260 to processor board 212 resets the counters used to determine the grinding head position on the basis of the output signals from encoder 16. The $\phi_A$ and $\phi_B$ encoder signals are coupled from logic board 260 to processor board 212 on lines 220 and 218, respectively. Line 222 carries a "top compare" signal from the comparators on processor board 212 which indicates that the actual position of the grinding head corresponds to the upper reciprocation limit set on thumbwheel switches 170. The "bottom compare" signal carried by line 224 indicates when the postion of the grinding head coincides with the lower reciprocation limit set on thumbwheel switches 172. The thumbwheel switch data is coupled via lines 202 to thumbwheel board 204. The settings of thumbwheel switches 170 are scanned on thumbwheel board 204 using the top strobe signal carried on line 210 from processor board 212. Similarly, the settings of thumbwheel switches 172 are scanned using the bottom strobe signal carried on line 208. Signals representative of the thumbwheel settings are carried on line 206 from thumbwheel board 204 to processor board 212 in parallel.

In the event that the upper reciprocation limit designated by the settings of thumbwheel switches 170 is a value which is lower than the lower reciprocation limit set on thumbwheel switches 172, an error condition will be detected and signaled by the "crossed limits" signal carried to logic board 260 on line 226 from processor board 212. A crossed limits signal will also be generated if a thumbwheel is adjusted at the instant that a grinding head reversal takes place. Upon receiving the crossed limits signal, logic board 260 will 9enerate a head up signal on line 86.

In the wipe mode of operation, upper thumbwheel switches 170 are used to set the limit value indicative of the point at which valve 80 (FIG. 2) is actuated to slow the travel of the grinding head from the initial relatively fast rate of speed to a relatively slow speed.

The recip/wipe and free run/latch signals from operator control panel 36 are transmitted through logic board 260 to processor board 212 on lines 228 and 230, respectively. The top and bottom strobe signals used to scan thumbwheel switches 170 and 172 are generated by logic board 260 and coupled to processor board 212 across lines 238 and 236, respectively.

Those skilled in the art will appreciate that the circuitry which performs the logic board and processor board functions can be designed in accordance with conventional techniques. The circuitry may be hard wired from various gates, or may alternatively be embodied in a microprocessor. Specific circuit designs which implement the functions as described herein will be apparent to those skilled in the art.

Another aspect of the present invention concerns the automatic outfeed of the grinding tool based upon the number of reciprocation strokes completed by the grinding head. The mechanical design of the outfeed control is depicted diagrammatically in FIG. 3. A stepper motor 14 is mounted to the yoke 50. An encoder 20, which produces $\phi_A$, $\phi_B$, and marker output signals 308 is mounted to sense the position of stepper motor shaft 15. Shaft 15 is coupled through gears 100, 102 to shaft 104 which, in turn, drives elongated gear 106. Engaged with gear 106 is outfeed gear 108 which has a threaded cylinder 110 extending therefrom. Threads 112 on threaded cylinder 110 engage fixed threads 116 on a complementary threaded cylinder 114 extending from yoke 50. Thus, when outfeed gear 108 rotates in response to the rotary motion of stepper motor 14, it rides up and down with respect to yoke 50 on threads 112, 116. Accordingly, the rotational motion of stepper motor 14 is translated to vertical motion. A "home position" of outfeed gear 108, and hence the outfeed home position, is detected by microswitch 120 which is actuated by tab 118 on outfeed gear 108.

An outfeed rod or link 132 is spring biased by spring 124 against outfeed gear 108. A bearing 122 is provided at the interface between outfeed gear 108 and outfeed rod 132. Spring 124 is mounted between a fixed portion 128 of yoke 50 and a pin 126 extending transversely from rod 132. Thus, as outfeed gear 108 moves up and down in response to rotation from stepper motor 14, outfeed rod 132 will move up and down. The free end 136 of outfeed rod 132 is tapered and engages with dog 138 mounted to a fixed point by a pivot 140. Thus, as outfeed rod 132 moves up and down, the point 142 extending from dog 138 moves transversely. The transverse movement of point 142 is transferred to a bearing surface 144 of toolholder 26, which is biased against point 142 by a spring 148. Spring 148 is sandwiched between a bearing 150 and a fixed point 152.

Figure 3:
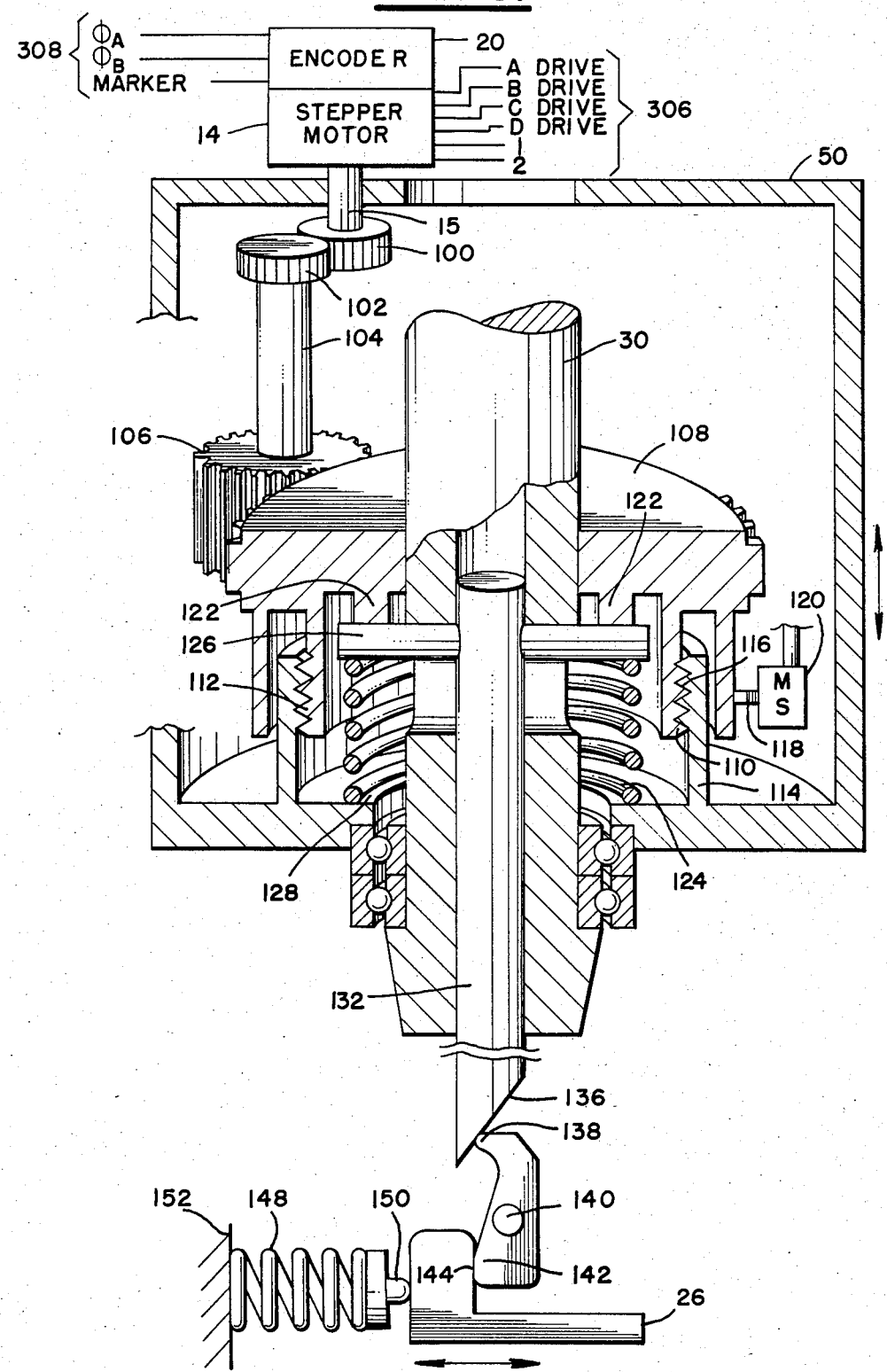
FIG. 3 is a diagrammatic view of the outfeed mechanism of the present invention.

It should now be clear that rotary movement of stepper motor 14 is translated to transverse movement of toolholder 26 through outfeed gear 108 and outfeed rod 132. Outfeed rod 132 is concentric with spindle 30. Although the diagram of FIG. 3 depicts spindle 30 as a cylinder, those skilled in the art will appreciate that it can alternatively comprise a series of links. Spindle 30 is driven by motor 18 (see FIG. 1) by a transmission (not shown). The rotary movement of spindle 30 is used to provide conventional planetary and arc segment motion to a grinding tool mounted thereto.

Figure 6:
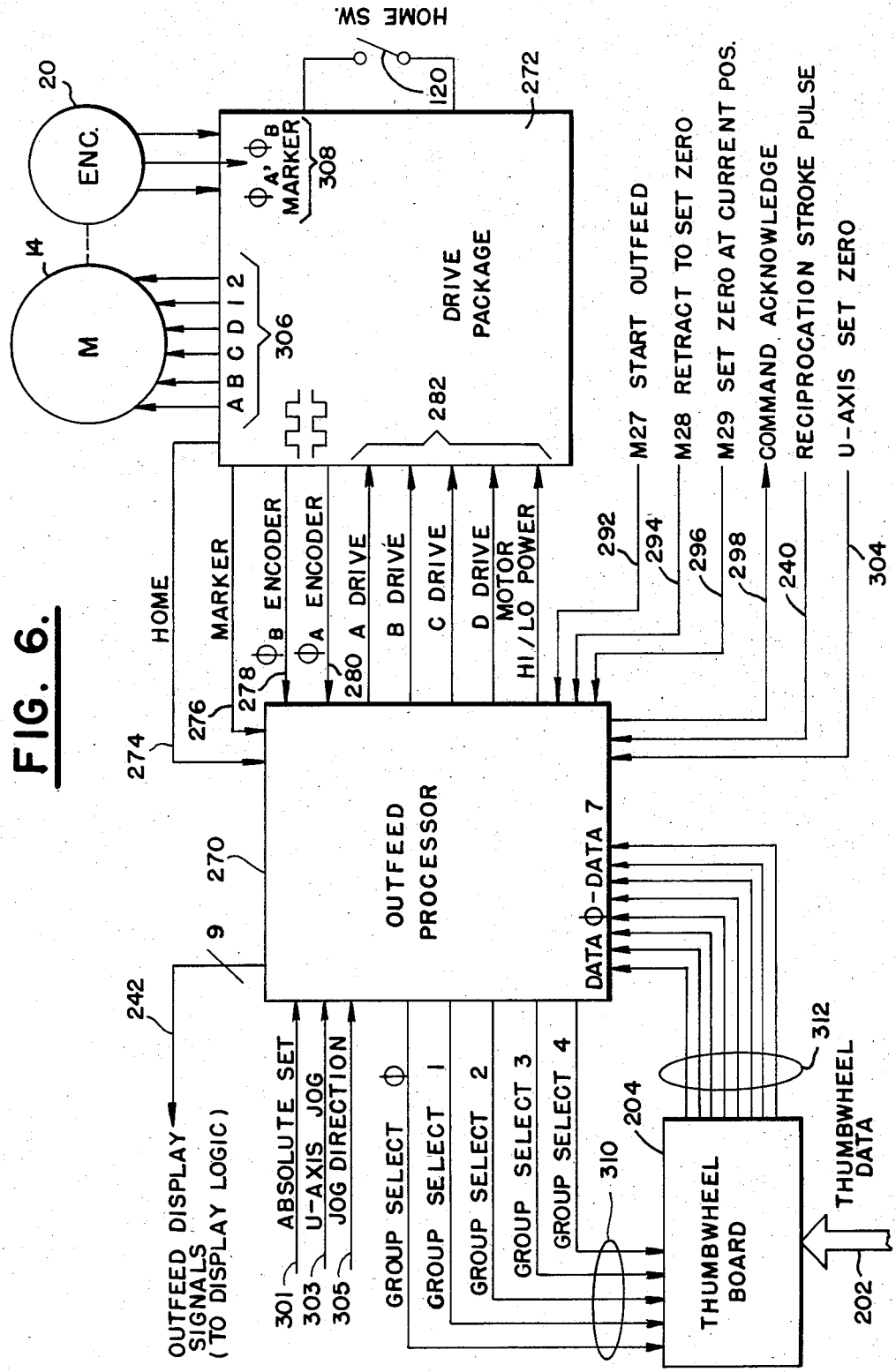
FIG. 6 is a block diagram of the electrical circuitry for outfeed control.

Stepper motor 14 is controlled by outfeed processor circuitry as shown in FIG. 6. An outfeed processor 270 is coupled to thumbwheel board 204 via group select lines 310 and data lines 312. Thumbwheel board 204 receives data from outfeed thumbwheel switches 166 and reciprocation stroke count thumbwheel switches 168 via lines 202 from operator control panel 36. Referring to FIG. 4, thumbwheel switches 166 are used to set the incremental outfeed distance which the grinding tool will move each time a predefined number of reciprocation strokes is completed. Such movement occurs along the U-axis. The position of the grinding wheel along the U-axis is displayed on display 162. The zero for the U-axis is set by actuating switch 174. Thumbwheel switches 168 are used to designate the number of reciprocation strokes to be completed between each successive outfeed.

Switch 180 is a two-position select/push switch which enables the machine operator to initiate movement of the U-axis to the absolute zero, or set zero position. Switch 182 is a U-axis jog control switch. This two-position select/push switch initiates high or incremental jogging of the U-axis. Switch 184 controls the U-axis jog direction. The switch can be set to enable outfeed of the grinding wheel away from the spindle axis or toward the spindle axis. Outputs from switches 180, 182 and 184 are coupled to the outfeed processor shown in FIG. 6 via lines 301, 303, and 305 respectively. Actuation of the U-axis zero set switch 174 is signaled on line 304.

Outfeed processor 270 shown in FIG. 6 is a microprocessor which scans the various U-axis switches and controls outfeed stepper motor 14 in accordance with the switch settings. Outfeed processor 270 also is coupled to receive commands from the machine tool numerical controller housed in cabinet 34 (FIG. 1) via lines 292, 294, and 296. Line 292 carries an "M27" code from the numerical controller which outfeeds the U-axis by the amount set on thumbwheel switches 166. Once an M27 code is executed, subsequent outfeeds will be inhibited until the number of reciprocation strokes designated by thumbwheel switches 168, if any, is completed.

An "M28" code, coupled to outfeed processor 270 by line 294, serves to return the outfeed to the last set zero position, if set, or to the outfeed home (absolute zero), automatically taking out the backlash in the U-axis upon reaching the destination. The "M29" code, coupled to outfeed processor 270 by line 296, is used to zero the U-axis.

Outfeed processor 270 controls outfeed motor 14 through a conventional stepper motor drive package 272. Drive package 272 receives the $\phi_A$, $\phi_B$, and marker signals on lines 308 from encoder 20 and couples them across lines 280, 278, and 276, respectively, to outfeed processor 270. Drive package 272 further detects the actuation of outfeed home switch 120, and signals this information to outfeed processor 270 via line 274. The A, B, C, and D drive signals to stepper motor 14, together with the motor high/low power signal from outfeed processor 270 are coupled through drive package 272 to stepper motor 14 across lines 282.

Figure 7:
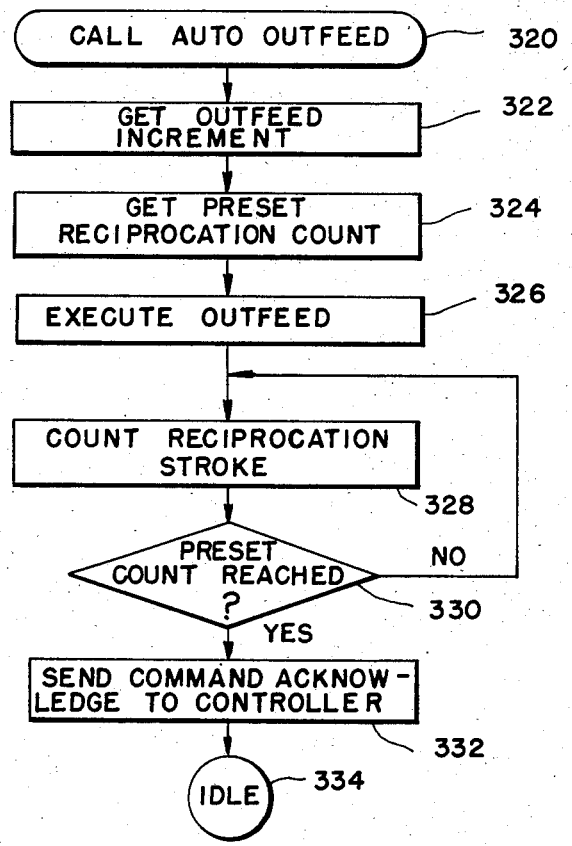
FIG. 7 is a flow chart of an automatic outfeed routine in accordance with the present invention.

A flow chart of the automatic outfeed routine executed by outfeed processor 270 is shown in FIG. 7. When an M27 code is input to outfeed processor 270, the automatic outfeed routine is called at box 320 of the flow chart. Control passes to box 322, where the outfeed increment set on thumbwheel switches 166 is fetched. At box 324, the preset reciprocation count set on thumbwheel switches 168 is fetched. Then, at box 326, the outfeed increment is executed by driving stepper motor 14 the required distance. Outfeed processor 270 then commences to count reciprocation strokes of the grinding head as shown at boxes 328 and 330. The reciprocation count is accomplished by counting reciprocation stroke pulses received from the reciprocation circuitry of FIG. 5 via line 240. A reciprocation stroke pulse is generated by logic 260 of the reciprocation circuitry each time the reciprocation direction is reversed. Upon receipt of each reciprocation stroke pulse, the outfeed processor determines at box 330 whether the preset reciprocation count, which is set in thumbwheel switches 168, has been reached. If the preset count has not been reached, control is returned to box 328 and the reciprocation stroke count continues. Once the preset count is reached, control is passed from box 330 to box 332 and a command acknowledge signal is sent from outfeed processor 270 to the numerical controller via line 298. Upon receipt of the command acknowledge signal, the numerical controller knows that the M27 outfeed command has been executed, and proceeds to the next programmed instruction. In this manner, successive outfeeds cannot be accomplished until the number of preset reciprocation counts has been completed. After a command acknowledge is sent to the numerical controller, control of the automatic outfeed routine is passed to box 334, where the routine idles until the next M27 outfeed code is received from the numerical controller.

The display of the U-axis position on display 162 is accomplished by processor board 212 (FIG. 5) in response to outfeed display signals from outfeed processor 270. The outfeed display signals are carried on lines 242 from outfeed processor 270 to logic board 260, and from logic board 260 to processor board 212 via lines 214.

It will now be appreciated that the present invention provides a control system for a machine tool having a spindle, means for outfeeding the tool from the longitudinal axis of the spindle, and means for longitudinally reciprocating the spindle. The control system enables the tool to be outfed a preset distance increment when the spindle completes a predefined number of reciprocation strokes. The distance increment and reciprocation stroke count are set by a machine operator through the use of suitable input means on an operator control panel. The outfeed distance increment and reciprocation count settings can be changed by the operator while the machine tool is in operation.

In accordance with another aspect of the invention, the machine tool spindle is automatically moved from an upper position toward a first point at a relatively fast rate of speed, and from the first point to a workpiece at a relatively slow rate of speed. The point at which the speed transition occurs is set by a machine operator by a suitable input means on the operator control panel. The actual rates of speed can be set by manually adjusting the sizes of first and second orifices. Although the first and second orifices are arranged in a parallel circuit in the disclosure of the preferred embodiment, those skilled in the art will recognize that other arrangements of the orifices and the electrically actuated valve in series with the first orifice would also be suitable.

Obviously, numerous additional modifications and variations of the present invention are possible in light of the above teachings. It is therefore to be understood that within the scope of the appended claims, the invention may be otherwise practiced than as specifically described herein.

What is claimed is:

1. A control system for an automated jig grinder having a spindle, a grinding tool coupled to said spindle, means for outfeeding said grinding tool from the spindle axis, and means for reciprocating said grinding tool, said control system comprising:
   a control processor;
   means coupled to said processor for enabling an operator to designate an incremental outfeed distance to be traversed for each outfeed operation;
   means coupled to said processor for enabling an operator to designate a reciprocation stroke count to be completed between successive outfeeds;
   means operatively associated with said processor for counting grinding tool reciprocation strokes; and
   means responsive to said counting means for actuating the jig grinder outfeeding means to outfeed said grinding tool the designated outfeed distance when the reciprocation stroke count has been reached.

2. The control system of claim 1 further comprising means for restarting said counting means each time said outfeed means is actuated.

3. The control system of claim 1 further comprising means coupled to said processor for enabling an operator to designate an upper reciprocation limit and lower reciprocation limit to establish a reciprocation stroke length.

4. In a machine tool having:
   a spindle;
   a tool coupled to said spindle;
   means for outfeeding said tool from the longitudinal axis of said spindle in a direction away from said longitudinal axis; and
   means for longitudinally reciprocating said spindle, the improvement comprising:
   means operatively associated with said outfeeding means for automatically actuating said outfeed means to effect an outfeed of a preset distance increment when said spindle completes a predefined number of reciprocation strokes.

5. The machine tool of claim 4 wherein said means for automatically actuating said outfeed means comprises:
   a computer;
   means coupled to said computer for inputting outfeed distance increment data to said computer;
   means coupled to said computer for inputting reciprocation stroke count data to said computer; and
   means operatively associated with said computer for counting reciprocation strokes completed by said spindle;
   wherein said computer produces an outfeed signal in accordance with outfeed distance increment data when said counting means determines that said spindle has completed a predefined number of strokes in accordance with reciprocation stroke count data input to said computer.

6. The machine tool of claim 5 wherein said means for inputting outfeed distance increment data to said computer comprises switch means for enabling a machine operator to enter a desired outfeed distance increment and for storing the entered increment, and said computer comprises means for monitoring said switch means during the reciprocation of said spindle to produce said outfeed signal in accordance with a stored outfeed distance increment entered by an operator, whereby an operator can alter the outfeed distance increment for use by said computer while said spindle is reciprocating.

7. The machine tool of claim 6 further comprising switch means for enabling a machine operator to change the direction of the outfeed movement with respect to the spindle axis.

8. The machine tool of claim 6 wherein said means for inputting reciprocation stroke count data to said computer comprises switch means for enabling a machine operator to enter a desired reciprocation stroke count and for storing the entered count, and said computer comprises means for monitoring said switch means during the reciprocation of said spindle to obtain stored reciprocation stroke count data entered by an operator, whereby an operator can alter the predefined number of strokes while said spindle is reciprocating.

9. In a machine tool having
a spindle;
a work table mounted adjacent said spindle; and
means having an hydraulic circuit for moving said spindle toward said table from an upper position;
the improvement comprising:
a first orifice in said hydraulic circuit for passing hydraulic fluid at a first rate of flow;
a second orifice in said hydraulic circuit for passing hydraulic fluid at a second rate of flow; and
electrically actuable means for opening and closing at least one of said orifices in said hydraulic circuit to enable said spindle to travel from said upper position toward said table at a first initial rate of speed and to enable said spindle to subsequently continue its travel at a second rate of speed.

10. The machine tool of claim 9 wherein said first initial rate of speed is slower than said second rate of speed to prevent excessive overshoot when commencing a chop grinding procedure.

11. The machine tool of claim 9 wherein said first initial rate of speed is faster than said second rate of speed to enable a tool to be quickly brought toward a workpiece which is subsequently machined at the slower second rate of speed.

12. The machine tool of claim 11 further comprising:
a computer;
means for coupling said computer to said electrically actuable means; and
means for inputting a limit value into said computer indicative of a point to which said spindle is to travel toward said table at said relatively fast rate of speed;
whereby said computer controls said hydraulic circuit to move said spindle to said point at said relatively fast speed and thereafter toward said table at said relatively slow speed.

13. The machine tool of claim 9 wherein said first and second orifices are coupled in parallel, and said electrically actuable means comprises an electrically actuated valve in series with said first orifice for blocking the flow of hydraulic fluid to said first orifice.

14. The machine tool of claim 9 wherein the rate of flow across at least one of said orifices is manually adjustable.

* * * * *